United States Patent [19]

Tada

[11] Patent Number: 4,928,780
[45] Date of Patent: May 29, 1990

[54] SPEED CONTROL APPARATUS WITH COMPENSATION FOR ACTUATOR LINK PLAY

[75] Inventor: Tetsuya Tada, Anjyo, Japan

[73] Assignee: Toyota Jidosha Kabushiki Kaisha, Aichi, Japan

[21] Appl. No.: 336,327

[22] Filed: Apr. 11, 1989

[30] Foreign Application Priority Data

Apr. 20, 1988 [JP] Japan .................................. 63-98994

[51] Int. Cl.⁵ .............................................. B60K 31/02
[52] U.S. Cl. ...................................... 180/179; 123/361
[58] Field of Search ............... 180/176, 177, 178, 179; 123/342, 352, 361, 399

[56] References Cited

U.S. PATENT DOCUMENTS

| | | | |
|---|---|---|---|
| 4,346,776 | 8/1982 | Taplin ................................ | 180/179 |
| 4,597,465 | 7/1986 | Burney .............................. | 180/179 |
| 4,650,020 | 3/1987 | Mizuno et al. ................... | 180/176 |
| 4,727,838 | 3/1988 | Oshiage et al. .................. | 123/399 |
| 4,823,902 | 4/1989 | Onishi et al. ..................... | 123/361 |

FOREIGN PATENT DOCUMENTS 55-161165 11/1980 Japan .
60-51312 3/1985 Japan .
60-158586 7/1985 Japan .

*Primary Examiner*—David M. Mitchell
*Attorney, Agent, or Firm*—Oliff & Berridge

[57] ABSTRACT

An automatic speed control apparatus for vehicles for controlling speed with good responsiveness and without delay at the start. An actuator opens and closes a throttle valve independently of an accel pedal, and a link connects the throttle valve and the actuator. A speed sensor detects the vehicle speed and a speed control mechanism controls the actuator so that the vehicle speed from the speed sensor is maintained at a predetermined speed. The amount of idle working of the actuator caused by the play of the link when the throttle valve is opened by the actuator is detected and the detected amount of idle working is added to the amount of control of the speed control mechanism as an amount of offset working in the direction in which the throttle valve is opened.

7 Claims, 5 Drawing Sheets

SPEED CONTROL APPARATUS WITH COMPENSATION FOR ACTUATOR LINK PLAY

BACKGROUND OF THE INVENTION

1. Field of the Invention

The present invention relates to an automatic speed control apparatus for vehicles and, more particularly, to the improvement of an automatic speed control apparatus for vehicles which enables speed control at the beginning of constant-speed travel of a vehicle (hereinunder referred to "cruise") with quick responsiveness by using a cruising actuator sensor which can detect the amount of working of the cruising actuator itself.

2. Description of the Prior Art

The running speed of a vehicle is generally controlled by the driving force from the accelerator or accel pedal worked by the driver, but in the case of continuously driving the vehicle at a constant speed for a long time, automatically controlled cruise is useful which is so controlled as to automatically open and close the throttle valve at a preset speed. Such a control apparatus is mounted on vehicles as an automatic speed control apparatus and is helpful in lessening the fatigue of the drivers.

In such an automatic speed control apparatus, the delay in control at the beginning of cruise often irritates the driver and it is a common problem that if a delay in control occurs when the driver selects cruise by the set switch, the speed is temporarily reduced, thereby hindering the smooth running of the vehicle.

The delay in control is mainly caused by a trouble in the link mechanism which transmits the driving force of the actuator to the throttle valve. When the link mechanism requires a long route, for example, when the cruising actuator directly drives the accel pedal, the route of the link mechanism to the throttle valve becomes very long and since the link mechanism is heavy, even if the cruising actuator is operated swiftly by a predetermined amount of working, the play in the link mechanism directly leads to the delay in control of the throttle valve, thereby bringing out the above-described problems.

In a conventional automatic speed control apparatus, the play in the link mechanism from the cruising actuator to the throttle valve is stored in a control unit as a presupposed constant value, and when cruise running is selected, the thus-determined initial amount of offset is provided for the cruising actuator in order to cancel the play in the link mechanism.

The amount of offset, however, is different in vehicles and changes with time even in the same vehicle due to the frictional resistance of the link mechanism or the like. Practicable correction is therefore beyond the capabilities of the above-described conventional automatic speed control apparatus, in which the amount of offset is set at a presupposed constant value.

SUMMARY OF THE INVENTION

Accordingly, it is an object of the present invention to eliminate the above-described problems in the prior art and to provide an automatic speed control apparatus for vehicles which provides the cruising actuator at the starting thereof with the optimum amount of offset for each vehicle obtained from the play proper to the link mechanism of each vehicle, thereby enabling cruise with quick responsiveness without delay due to the play in the link mechanism.

To achieve this aim, an automatic speed control apparatus for vehicles according to the present invention comprises an actuator for opening and closing a throttle valve independently of an accel pedal, a link for connecting the throttle valve and the actuator, a means for detecting the amount of idle working of the actuator caused by the play of the link when the throttle valve is opened by the actuator, a speed sensor for detecting the vehicle speed, a speed control means for controlling the actuator so that the vehicle speed from the speed sensor is maintained at a predetermined speed, and a means for setting the amount of offset working by adding the amount of idle working detected by the means for detecting the amount of idle working to the amount of control of the speed control means as an amount of offset in the direction in which the throttle valve is opened.

According to the present invention, the automatic speed control unit measures the amount of idle working of the cruising actuator at necessary times or at every automatic control of cruise during the period from the time when a command for cruise is issued to the time when the throttle valve begins to move, and the amount of offset at the current time or the next time is determined on the basis of the measured amount of idle working. The cruising actuator is therefore immediately driven so as to open the throttle valve by the initial amount of offset, and control is begun in this state until the desired speed is obtained, so that the delay in opening of the throttle valve is reliably eliminated.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of an automatic speed control apparatus for vehicles according to the present invention will be explained with reference to the accompanying drawings.

Figure 1:
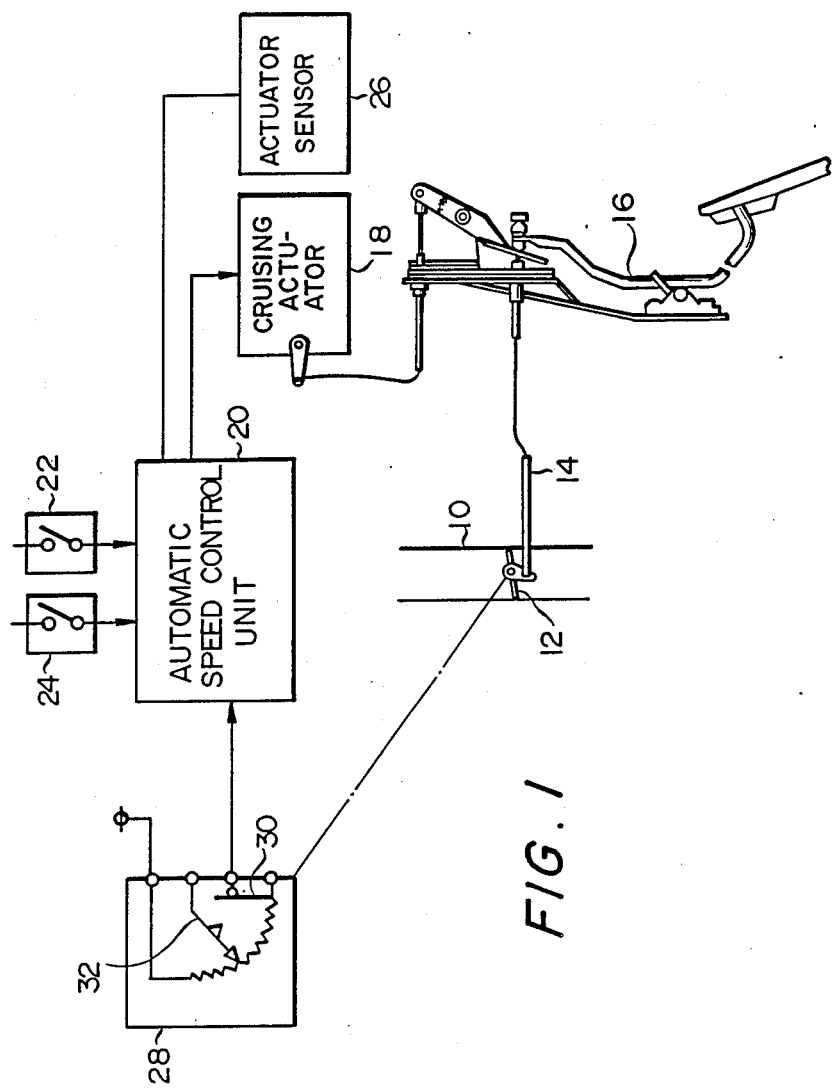
FIG. 1 schematically shows the structure of an embodiment of an automatic speed control apparatus for vehicles according to the present invention.

FIG. 1 shows the structure of an embodiment of an automatic speed control apparatus according to the present invention.

To a throttle valve 12 of a suction system 10 of an engine the driving force for opening or closing the throttle valve 12 is transmitted from an accel pedal 16 through a link 14 so as to effect the desired control of the throttle valve 12, as is well known.

In the present invention, the driving force from a cruising actuator 18 as well as the above-described driving force from the accel pedal 16 by the driver is provided for the throttle valve 12 for the purpose of automatic speed control. In this embodiment, the cruising actuator 18 outputs the driving force when the driver works the accel pedal 16, and the accel pedal 16 is so designed as to provide the cruising actuator 18 with the desired opening degree of the throttle valve 12 during automatically controlled cruise even if the driver's foot is not on the accel pedal 16.

In this embodiment, the cruising actuator 18 consists of an electric type actuator driven by a motor. As will be described later, such an electric type actuator driven by a motor is suitable for electrically detecting the amount of working of the cruising actuator 18.

In order to give a command for the desired cruise to the cruising actuator 18 and maintain the opening degree of the throttle valve 12 so as to keep the desired speed, an automatic speed control unit 20 is connected to the cruising actuator 18. The automatic speed control unit 20 is composed of, for example, a microcomputer.

A cruise setting signal is, as is well known, supplied from a set switch 22 to the automatic speed control unit 20, and when the set switch 22 is actuated, the current speed is stored as the constant speed and the vehicle is automatically cruised at this speed thereafter.

A cancel switch 24 is provided for cancelling the automatically controlled cruise. When a cancelling signal is supplied from the cancel switch 24 to the automatic speed control unit 20 by operating the brake or by switching to a special driving mode, the automatically controlled cruise is cancelled.

The feature of the present invention lies in that the cruising actuator 18 is provided in advance with a predetermined amount of offset working at the time of start of automatically controlled cruise by the automatic speed control unit 20 in order to prevent the throttle valve 12 from delaying in operation when the automatic speed control unit 20 starts the automatically controlled cruise in accordance with the set switch 22, and in that the amount of offset working is determined for each vehicle from the amount of idle working proper to each vehicle and is renewed at every automatically controlled cruise.

In order to obtain the accurate amount of working of the cruising actuator 18, the cruising actuator 18 in the present invention is provided with an actuator sensor 26, which constantly detects the amount of working of the cruising actuator 18 as an electric signal and is used for the feedback control of the amount of working of the cruising actuator 18 and for determining the initial amount of offset working, which is characteristic of the present invention.

In this embodiment, the actuator sensor 26 is composed of a potentiometer including a travelling contact which is connected to the motor driving shaft of the cruising actuator 18 consisting of a DC motor. The amount of working of the cruising actuator 18 is detected as a change in the voltage of the potentiometer.

In this embodiment, in order to detect the amount of idle working at the start of the automatically controlled cruise from the cruising actuator 18 to the throttle valve 12 through the link mechanism 14, an idle sensor 30 provided on the throttle sensor 28 is utilized for electrically detecting the starting operation of the throttle valve 12.

As is well known, the throttle sensor 28 for electrically detecting the opening degree of the throttle valve 12 includes a travelling contact 32 the rotation of which links with the movement of the throttle valve 12, and detects the voltage determined by the position of the travelling contact 32 as a throttle position signal, which is used for electric control of the suction system of the engine.

In this embodiment, the starting operation of the throttle valve 12 is detected by the idle sensor 30 of the throttle sensor 28 which detects the position of the travelling contact 32 at the full-close position of the throttle valve 12. More specifically, the idle sensor 30 is provided at the position at which the idle sensor 30 comes into contact with the travelling contact 32 at the full-close position of the throttle valve 12, and if the throttle valve 12 starts to open even slightly, the travelling contact 32 loses the contact with the idle sensor 30, whereby the automatic speed control unit 20 detects the starting operation of the throttle valve 12.

Figure 2:
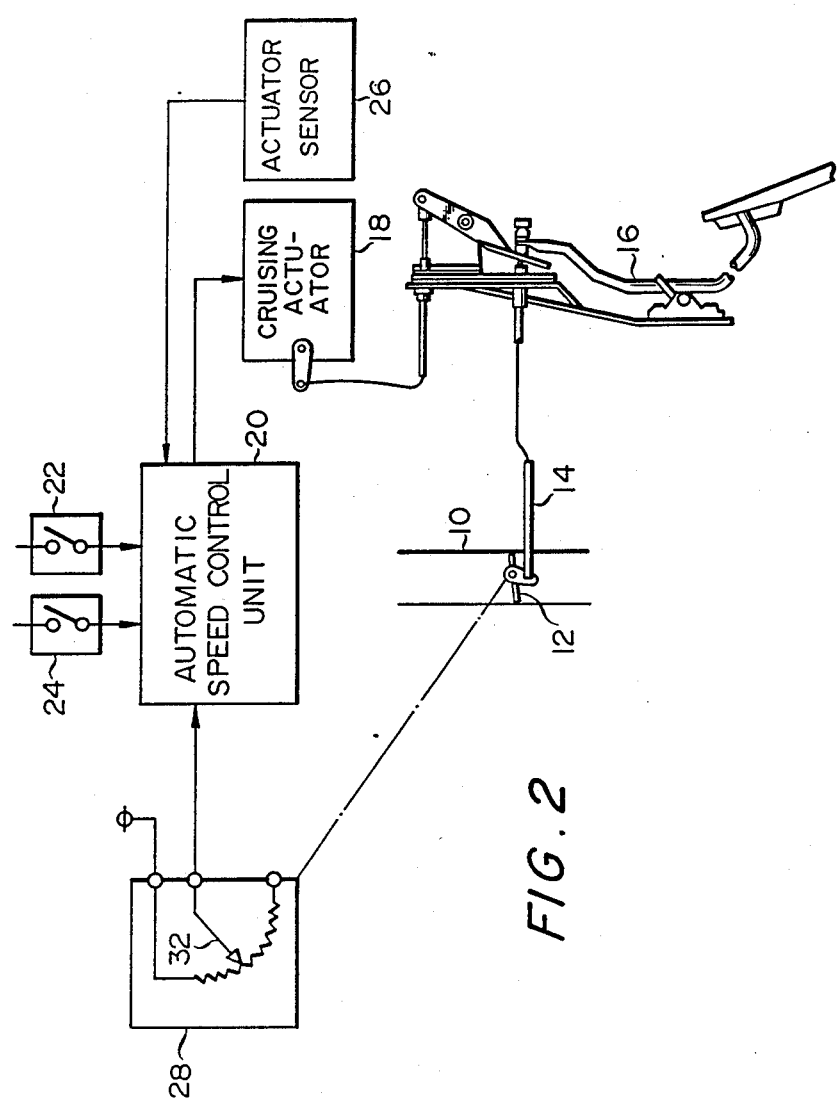
FIG. 2 schematically shows the structure of another embodiment of an automatic speed control apparatus for vehicles according to the present invention.

Although the travelling contact 32 of the throttle sensor 28 is situated at the intermediate portion of the potentiometer in FIGS. 1 and 2 for convenience of illustration, the travelling contact 32 is actually situated at one corresponding end of the potentiometer when the throttle vale 12 is fully closed as shown in FIGS. 1 and 2.

According to this embodiment, when a command for automatic cruise is issued by the set switch 22, the automatic speed control unit 20 drives the cruising actuator 18 so as to open the throttle valve 12. Since the link mechanism 14 having comparatively large play is provided between the cruising actuator 18 and the throttle valve 12, the amount of idle working which is absorbed by the link mechanism 14 delays the opening action of the throttle valve 12 when the cruising actuator 18 is driven so as to open the throttle sensor 12. The automatic speed control unit 20 measures the amount of idle working of the cruising actuator 20 obtained until the throttle valve 12 starts to open by utilizing the idle sensor 30 and from the signal output from the actuator sensor 26. Thus, the amount of idle working proper to the vehicle is accurately obtained. The measured value is stored in a memory or the like.

FIG. 2 shows another embodiment of the present invention. In this embodiment, the means for detecting the starting operation of the throttle valve 12 detects the starting operation by an electric signal which is obtained in accordance with the rotation of the travelling contact 32 provided on the throttle sensor 28. This embodiment therefore dispenses with the idle sensor 30 in the embodiment shown in FIG. 1.

The thus-stored amount of idle working is thereafter provided for the cruising actuator 18 as the amount of offset working at the time of driving the cruising actuator 18 by the automatic speed control unit 20, and simultaneously with the start of cruise, the cruising actuator 18 is momentarily moved by the amount of offset working. Thereafter, by adjusting the opening degree of the throttle valve 12 so as to obtain the desired speed, automatic speed control having good responsiveness without initial delay is realized.

It is naturally possible in the present invention that the amount of offset working is learned at every cruise, and the learned amount of offset working is provided for the cruising actuator 18 as the renewed data in the form of an offset amount signal, thereby constantly setting the optimum amount of offset working with respect to the amount of idle working which changes with time.

Figure 3:
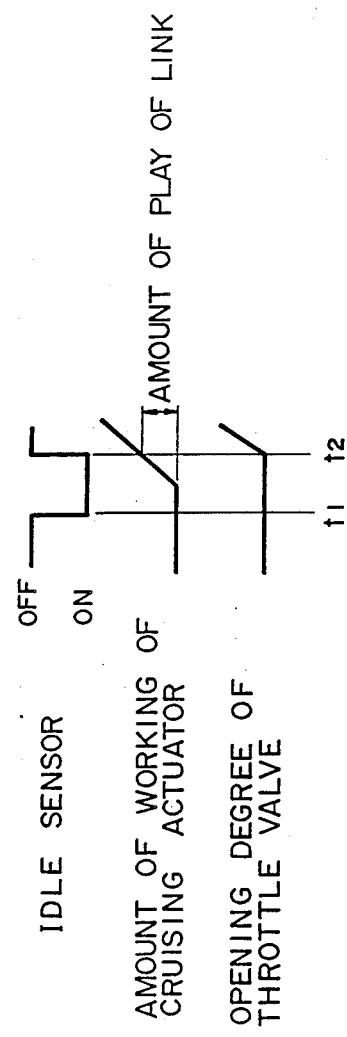
FIG. 3 is an explanatory view of the amount of idle working between the cruising actuator and the throttle valve.

FIG. 3 shows the amount of idle working of the throttle valve 12. When a command for automatic speed control is issued, the accel pedal 16 is returned to the unoperated state in an ordinary case. The throttle valve 12 is therefore returned to a fully closed state. As a result, the output of the idle sensor 30 temporarily assumes the ON state, as shown at the time $t_1$ in FIG. 3. In this state, the automatic speed control unit 20 supplies a working amount signal to the cruising actuator 18, whereby the amount of working of the cruising actuator 18 increases, as shown in FIG. 2. In spite of such an operation of the cruising actuator 18, the throttle valve 12 cannot be immediately opened due to the link mechanism 14 and the weight of the accel pedal 16, and it is not until the cruising actuator 18 moves by the amount of idle working indicated by the arrow in FIG. 3, namely, at the time $t_2$ that the throttle valve 12 starts to open. Thereafter, the opening degree of the throttle valve 12 increases at a predetermined rate. Since the idle sensor 30 loses contact with the travelling contact 32 at the time $t_2$, the output of the idle sensor 30 is turned off. The automatic speed control unit 20 can obtain the amount of offset working proper to the vehicle from the output signal of the idle sensor 30 and the amount of idle working of the actuator sensor 26.

Figure 4:
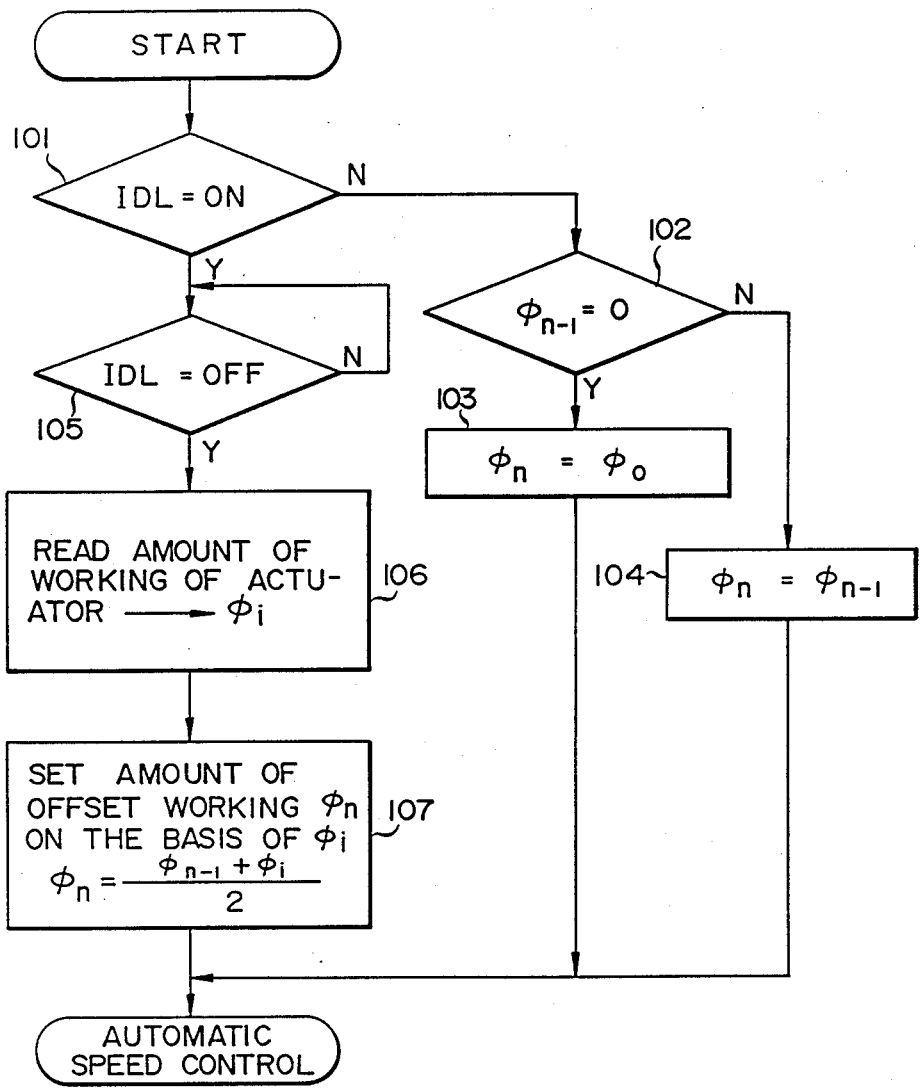
FIG. 4 is a flow chart explaining an example of the process for obtaining the amount of offset working in the present invention.

FIG. 4 shows an arithmetic program in the automatic speed control unit 20 for determining the amount of offset working in accordance with the present invention. According to this program, every time a command for automatic speed control is issued, the amount of offset working is renewed by calculation.

In FIG. 4, when a command for automatic speed control is issued, judgement is first made as to whether or not the output of the idle sensor 30 is in the ON state at the step 101. If the idle sensor 30 is not in the ON state, namely, the throttle valve 12 has not been returned to the fully closed state, the amount of offset working at the precedent time is read.

At the step 102, the amount of offset working $\phi n-1$ at the precedent time is read from the memory. If the thus-read amount of offset working $\phi n-1$ is 0, in other words, cruise is carried out for the first time, the amount of offset working $\phi n$ at the current time is set at an average amount of offset $\phi 0$.

On the other hand, if the amount of offset working $\phi n-1$ at the precedent time is stored as a constant value, the automatic speed control unit 20 uses the amount of offset working $\phi n-1$ at the precedent time as the amount of offset working $\phi 1$ at the current time at the step 104.

If the throttle valve 12 has been returned to the fully closed state at the step 101, the apparatus assumes a standing state until the throttle valve 12 starts to open. When the throttle valve 12 starts to open and the starting operation thereof is detected by the output of the idle sensor 30 which assumes the OFF state at the step 105, the amount of working $\phi i$ of the cruising actuator 18 is read at the step 106. The thus-read amount of working $\phi i$ of the cruising actuator 18 is electrically supplied from the actuator sensor 26 to the automatic speed control unit 20. At the step 107, the automatic speed control unit 20 calculates the average value of the amount of working $\phi i$ of the cruising actuator 18, namely, the amount of idle working and the amount of offset $\phi n-1$ set at the precedent time. This averaging operation enables the reduction of a possible error in the value of the amount of working of the cruising actuator which has been measured by the actuator sensor 26.

In the above-described way, on the basis of the amount of offset working $\phi n$ obtained in correspondence to each case, automatic speed control is started.

Figure 5:
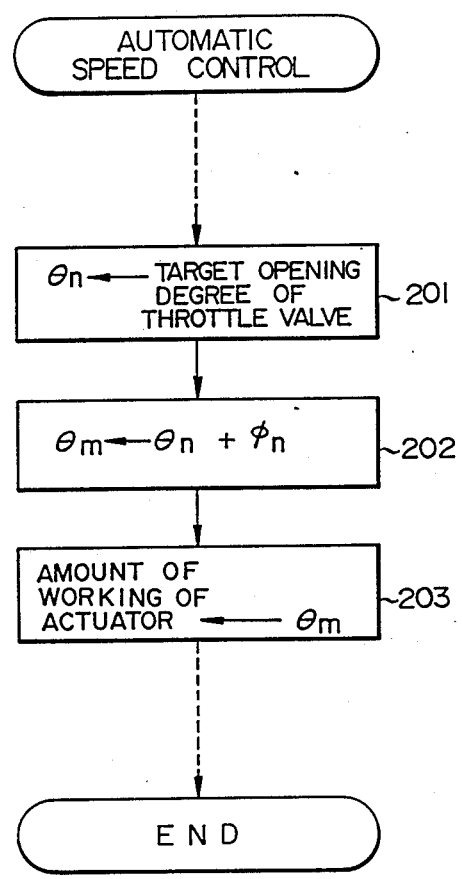
FIG. 5 is a flow chart explaining the automatic speed control using the amount of offset working obtained by the process shown in FIG. 4.

FIG. 5 is a flow chart of automatic speed control using the amount of offset working $\phi n$. At the step 201, the target opening degree $\theta n$ of the throttle valve 12 is set. At the step 202, the desired amount of working $\theta m$ of the cruising actuator 18 is calculated by adding the amount of offset working $\phi n$ obtained in FIG. 4 to the target opening degree $\theta n$ of the throttle valve 12.

The signal representing the thus-calculated amount of working $\theta m$ of the cruising actuator 18 including the amount of offset working is supplied to the cruising actuator 18 as the amount of working of the cruising actuator 18, thereby initiating the desired automatic speed control.

As described above, according to the present invention, automatic speed control having good responsiveness without delay at the start is enabled by absorbing the amount of idle working due to the play in the link mechanism as the amount of offset working of the cruising actuator.

Although an electric type actuator driven by a motor is used as the cruising actuator in this embodiment so as to enable the amount of working of the cruising actuator to be detected with extremely high accuracy, a conventional negative pressure type actuator is also usable by detecting the accurate position of the diaphragm.

In this embodiment, every time automatic speed control is started in the fully closed state of the throttle valve, the amount of offset working is renewed. However, in the case in which a change in the amount of offset working with time is small, a constant amount of offset working may be used during a predetermined period of cruise.

In this embodiment, the throttle sensor may be so designed as to also serve as the idle sensor, thereby simplifying the structure of the apparatus. When such a throttle sensor is not available, the idle sensor may be provided separately from the throttle sensor. Such an idle sensor is obtained by connecting a simple switch to the throttle valve.

As described above, according to the present invention, the amount of idle working due to the play in the link mechanism or the like from the cruising actuator to the throttle valve is measured and learned in advance for each vehicle, and the thus-obtained amount of idle working is provided as the amount of offset working of the cruising actuator. Thus, automatic speed control having good responsiveness without delay at the start is realized.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An automatic speed control apparatus for vehicles comprising:

an actuator for opening and closing a throttle valve independently of an accel pedal;

a link for connecting said throttle valve and said actuator;

a means for detecting the amount of idle working of said actuator caused by the play of said link when said throttle valve is opened by said actuator;

a speed sensor for detecting the vehicle speed;

a speed control means for controlling said actuator so that the vehicle speed from said speed sensor is maintained at a predetermined speed; and a means for setting the amount of offset working by adding the amount of idle working detected by said means for detecting the amount of idle working to the amount of control of said speed control means as an amount of offset working in the direction in which said throttle valve is opened.

2. An automatic speed control apparatus for vehicles according to claim 1, wherein said means for detecting the amount of idle working includes:

an actuator sensor for detecting the amount of working of said actuator;

an idle sensor for judging the full-close position of said throttle valve; and a means for detecting the starting operation of said throttle valve at said full-close position by a signal from said idle sensor and detecting as the amount of idle working the amount of working of said actuator which is detected by said actuator sensor at that time.

3. An automatic speed control apparatus for vehicles according to claim 1, wherein said means for detecting the amount of idle working includes:

an actuator sensor for detecting the amount of working of said actuator;

a throttle sensor for detecting the opening degree of said throttle valve; and a means for detecting the starting operation of said throttle valve at the full-close position by a signal from said throttle sensor and detecting as the amount of idle working the amount of working of said actuator which is detected by said actuator sensor at that time.

4. An automatic speed control apparatus for vehicles according to claim 1, wherein said means for setting the amount of offset working includes:

an averaging means for setting a new amount of offset working by averaging the amount of idle working detected by said means for detecting the amount of idle working and the current amount of offset working.

5. An automatic speed control apparatus for vehicles according to claim 1, wherein said actuator is composed of an electric type actuator driven by a motor which electrically detects the amount of working of said actuator.

6. An automatic speed control apparatus for vehicles according to claim 5, wherein said actuator sensor is composed of a potentiometer including a traveling contact which is connected to the driving shaft of said motor constituting said actuator.

7. An automatic speed control apparatus for vehicles according to claim 2, wherein said idle sensor is composed of a switch which is turned on when said throttle valve is at said full-close position by coming into contact with a travelling contact interlocking with said throttle valve and which is turned off when said throttle valve is not at said full-close position by losing contact with said travelling contact.

* * * * *